April 10, 1962  R. O. ROBINSON, JR  3,029,426
SYSTEM FOR OBTAINING MISS DISTANCE
Filed Dec. 10, 1956  3 Sheets-Sheet 1

INVENTOR
RALPH O. ROBINSON, JR.

BY
ATTORNEYS

April 10, 1962  R. O. ROBINSON, JR  3,029,426
SYSTEM FOR OBTAINING MISS DISTANCE
Filed Dec. 10, 1956  3 Sheets-Sheet 3

INVENTOR
RALPH O. ROBINSON, JR.
BY
ATTORNEYS

United States Patent Office

3,029,426
Patented Apr. 10, 1962

3,029,426
SYSTEM FOR OBTAINING MISS DISTANCE
Ralph O. Robinson, Jr., Silver Spring, Md., assignor to the United States of America as represented by the Secretary of the Navy
Filed Dec. 10, 1956, Ser. No. 627,518
1 Claim. (Cl. 343—6)

This invention relates generally to devices for determining miss distance, and more particularly to apparatus and method for determining the distance that a guided missile misses a moving target at which it is fired, such as an aircraft.

For a long time in the research and development of guided missiles, there has been a need for apparatus which would accurately and effectively determine miss distance when a guided missile was fired at a moving target, such as an aircraft. To date, optical methods and apparatus have been used for determining miss distance, and such apparatus and methods have been quite accurate under favorable circumstances but the usefulness thereof has been limited under overcast or poor lighting conditions.

Numerous other techniques have been proposed for measuring the distance by which a guided missile missed its target. However, all systems proposed thus far employ supplemental, space-consuming equipment either on the missile or on the ground.

Knowledge of the distance separating a guided missile and its aerial target at the time its warhead detonates or the distance between the missile and target if detonation of the warhead does not occur is of value when employing guided missiles against an enemy target. Such knowledge might establish whether a kill of the target had or had not been made, thus permitting successive missiles to be directed at other targets or at the same target until a kill thereof was indicated.

Present plans call for the employment of two missiles fired in salvo to affect a calculated kill probability of 75 percent. It is evident, therefore, that both efficiency and total fire power may be increased by introducing a greater flexibility in the number of missiles to be expended on a given aerial target.

The distance separating a target and a missile may be obtained in several ways. The method which has the most appeal is that which would utilize a maximum of the existing known radar and proximity fuse techniques and which would employ equipment already present in the missile.

One of the arrangements selected in this invention utilizes a passive radar system which operates off the guidance radar beam and from the signal reflected from the target. The time interval between the pulses can, with certain reservations, be interpreted in terms of the separation between the target and missile. Since the interpretation of the information can probably be done better on the ground than in the missile, the telemetering radar link might be made to serve in the capacity of relaying this information to a ground station. However, other modifications of this arrangement can be utilized.

It is an object of this invention, therefore, to provide an indicator device and a method which can be utilized for determining the distance that a guided missile misses a moving target.

Still another object of this invention is to provide a novel miss distance indicator which will determine the distance separating a guided missile and its aerial target at the time its warhead detonates or the distance between the missile and target if detonation of the warhead does not occur.

To provide a unique miss distance indicator in which a minimum of additional equipment either on the missile or on the ground is required, is still another object of this invention.

To provide a novel miss distance indicator and method which can be used efficiently and effectively under a wide range of atmospheric and lighting conditions, is still another object of this invention.

These and other objects and advantages of this invention will become more apparent from the following description taken in conjunction with the accompanying drawings in which.

In accordance with this invention, a novel method and apparatus is provided for determining the distance that a guided missile misses a moving target. The apparatus includes means for illuminating the target with a direct radio frequency signal, toegther with means for detecting the reflected signal from the target. Other means are provided for mixing the detected signal to obtain another signal whose frequency differs from the detected signal due to the Doppler effect. Additional means are provided for amplifying, transmitting and recording the Doppler frequency signal so that the miss distance can be obtained from the recorded Doppler frequency signal.

Figure 4:
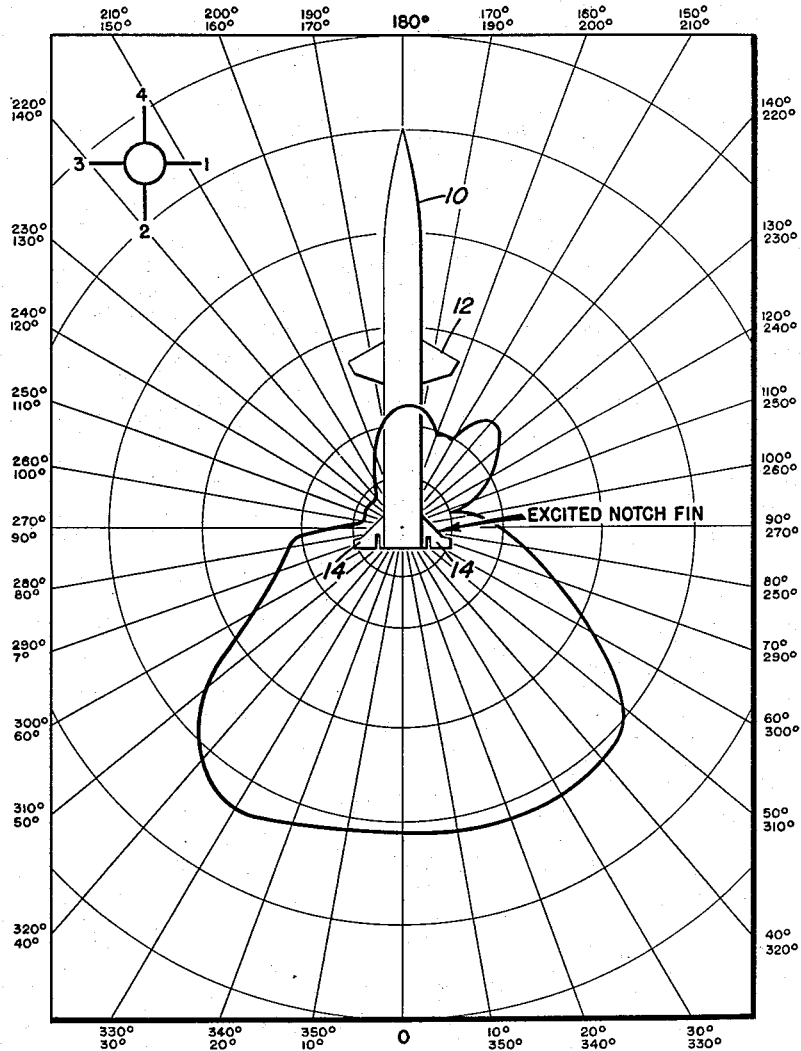
FIG. 4 is a graphical representation of the radiation pattern of a single notch-excited fin antenna used in the miss distance indicator system.
Figure 5:
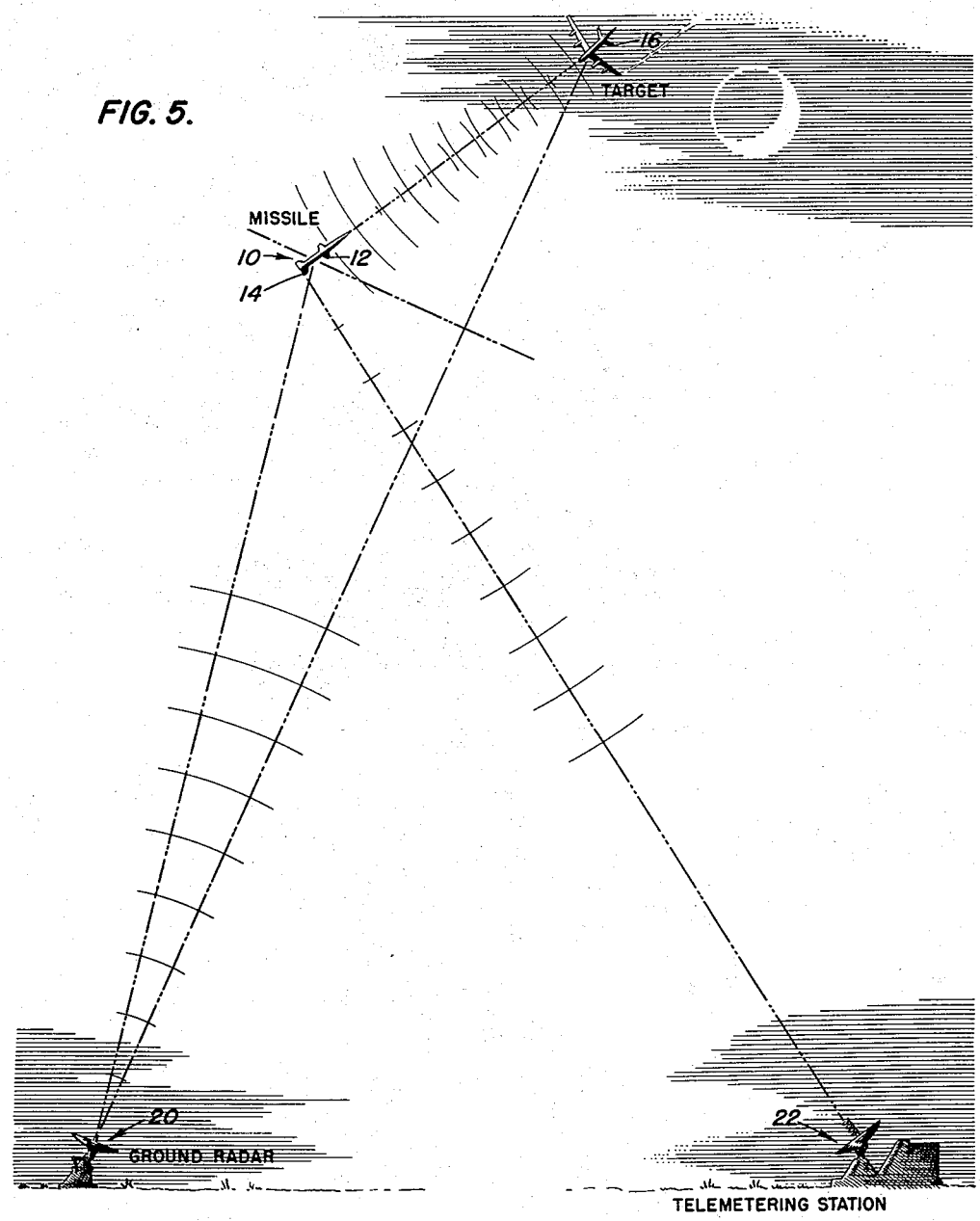
FIG. 5 is a schematic of apparatus used in a modified form of the invention, illustrating the relationship between the missile, target, ground transmitter and telemetering station.

Referring now to FIGS. 4 and 5 of the drawings, there is illustrated a missile 10 having two pairs of wings 12 for steering the missile and two pairs of fins 14 for stabilizing the missile while in aerial flight to a target, such as an aircraft 16.

Figure 1:
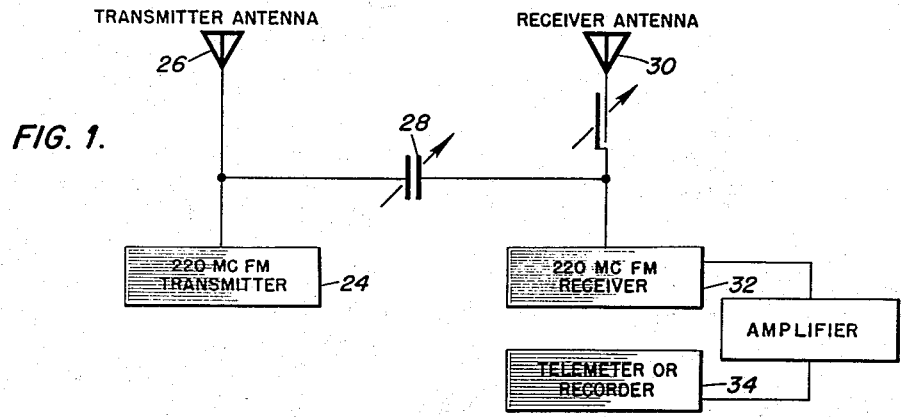
FIG. 1 is a schematic of a miss distance indicator system comprising this invention.

The missile 10, shown in FIGS. 4 and 5 of the drawings can be used with the embodiment of the invention shown in FIG. 1. Here, there is illustrated a conventional 220 mc. FM telemetering transmitter 24, which is positioned in the missile 10 to illuminate the target in a continuous wave Doppler system. The signal from the transmitter 24 is transmitted by an antenna 26 (which can be of the excited notch antenna type) and the reflected signal from the target 16 is picked up by an antenna 30 (a notch antenna).

The received signal is mixed with a portion of the directly radiated signal from the transmitter 24 in a 220 mc. FM receiver 32. The effect of cross-coupling between the transmitting antenna 26 and the receiving antenna 30 is held to a minimum by feeding a portion of the directly radiated signal to the terminals of the receiver 32 and adjusting the phase and amplitude of the signal in such a manner as to partially cancel the signal due to cross-coupling.

The output of the receiver 32 consists of the frequency by which the two signals differ due to the Doppler effect. The Doppler frequency signal can then be transmitted by the telemeter 34 to a telmetering receiving station 22 located on the ground, as shown in FIG. 5, or at some remote point, where it is recorded. The miss distance between the missile 10 and the target 16 is obtained from the Doppler record as will be described in more detail subsequently.

Referring now to FIG. 5 of the drawings, there is shown a second embodiment of the invention in which a transmitter 20 (such as ground radar) is positioned on the ground. This transmitter 20 is arranged to send a continuous wave signal to both the missile 10 and the target 16 as shown. The signal reflected by target 16 is picked up by an antenna, such as antenna 30 in FIG. 1, and is combined in the receiver 32 with a portion of the signal transmitted directly to missile 10 by transmitter 20. The output signal of the receiver 32, which is representative of the Doppler frequency, is transmitted by means of the telemeter 34 to the telemetering receiving station 22 or to some other remote point where it is recorded as previously described.

The Doppler frequency $f_d$ is obtained from the relationship:

$$f_d = \frac{2\dot{R}}{\lambda}$$

where $\dot{R}$ = closing velocity between the missile and target; and
$\lambda$ = wavelength of illuminating signal expressed in the same linear units as $\dot{R}$.

The closing velocity R is related to the missile velocity $V_m$ and the miss distance $d$ by the following equation:

$$\dot{R} = V_m \sqrt{\frac{1}{\left(\frac{d}{V_m t}\right)^2 + 1}} \qquad \text{Eq. (1)}$$

where $t$ = total flight time, expressed in seconds.

Figure 2:
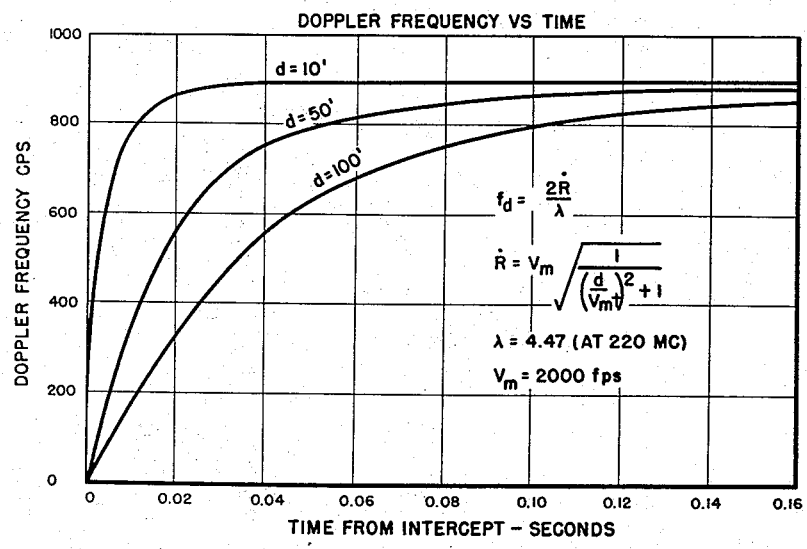
FIG. 2 is a graphical representation of the Doppler frequency versus time for a miss distance indicator system.

By using the above equations, a family of curves can be plotted, each relating to a different miss distance. Such a family of curves is shown in FIG. 2 of three different distances. These curves were computed for a 200 mc. transmitter and a missile velocity of 2000 f.p.s. Comparison between such a family of curves and a plot of the actual attained Doppler frequency versus time will indicate which computed curve most nearly fits the attained curve, and consequently what the miss distance was.

Several other solutions for obtaining miss distance from Doppler data can be used. The most accurate solution is based on the assumptions of linear motion and constant acceleration of the missile. The following equation is employed:

$$V_1 = \frac{\dot{R}_2(d + L_2)}{L_2(2d + L_2)} - \Delta V \qquad \text{Eq. (2)}$$

where $V_1$ = velocity of missile at a given time $t_1$;
$R_2$ = closing velocity at time $t_2$;
$d$ = miss distance;
$L_2$ = change in distance from missile to target between time $t_2$ and intercept; and
$\Delta V$ = change in missile velocity between times $t_1$ and $t_2$.

Figure 3:
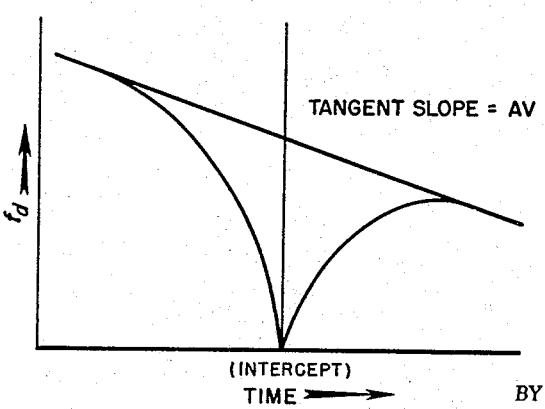
FIG. 3 is a graphical representation of the Doppler frequency resulting when acceleration of the missile is constant and velocity thereof is changing.

It has been determined empirically that a very accurate value of $\Delta V$ can be obtained by plotting $\dot{R}$ versus time before and after intercept and then constructing a tangent to the resulting curve. The slope of the tangent is the value of $\Delta V$. When the velocity of the missile is changing, the portions of the Doppler plot before and after intercept are asymmetrical and have a shape of the nature of that shown in FIG. 3. The construction of the tangent referred to is also shown in FIG. 3.

All other terms in Eq. 3 are known or can be calculated from known quantities, except for $V_1$ and $d$. The equation can be solved by the process of iteration.

A serious problem in this system is the severe attenuation of the reflected signal. As the missile approaches the target, the forward radiation from the notch excited fin antenna must be utilized. Since the telemetering antenna system was designed to provide maximum radiation to the rear of the missile, the forward radiation is relatively small, as can be seen from FIG. 4.

In order to reduce Doppler data on miss distance out to 100 feet, a signal must be recorded for 500 feet before intercept of 500 feet beyond intercept. For a miss of 100 feet, an angle between the axis of the missile and the line of sight to the target at a distance of 500 feet would be:

$$\theta = \text{Arc sin } 100/500 = 11.3° \qquad \text{Eq. (4)}$$

Referring again to FIG. 4, it can be seen that over such an angle the forward radiation is approximately 8 db down from the rearward radiation. Hence, the gain in the forward direction is $-8$ db or 0.159 when referred to a doublet (since the rearward radiation is essentially the same as that from a doublet).

Utilizing the same gain figure for both the transmitting and receiving antennae, the ratio of reflected power to transmitted power at a distance of 500 feet may be computed from the following equation:

$$\frac{P_2}{P_1} = G_1 G_2 \cdot \frac{3\sigma \lambda^2}{8\pi d^2 (4\pi d)^2} \cdot A_P^4 \qquad \text{Eq. (5)}$$

where $G_1$ = gain of the transmitter antenna = 0.159;
$G_2$ = gain of receiver antenna = 0.159;
$\sigma$ = radar cross section = 120 sq. ft.;
$d$ = distance from missile to target = 500 ft.;
$\lambda$ = transmitter wavelength = 4.47 ft. for 220 mc.; and
$A_p$ = path gain factor = 1 for free space.

The above Equation 5 yields a figure of 110 db power loss for the conditions stated. Assuming no power loss due to antenna leads or mismatch, the voltage $E_r$ at the receiver terminals can be computed from the equation:

$$E_r = \sqrt{P.R} \qquad \text{Eq. (6)}$$

where $P$ = power received = $2 \times 11 \times 10^{-10} = 220 \times 10^{-12}$ watts; and
$R$ = receiver input impedance = 50 ohms.

Equation 6 yields a figure of 105 $\mu$v. at the receiver terminals.

Obviously many modifications and variations of the present invention are possible in the light of the above teachings. It is therefore to be understood that within the scope of the appended claim the invention may be practiced otherwise than as specifically described.

What is claimed is:

Apparatus for determining the distance that a missile misses a target, comprising; transmitter means positioned at a point remote from said missile and said target for sending a direct radio frequency signal to both of said missile and said target, detection means within said missile for detecting the reflected radio frequency signal originating when said direct radio frequency signal is reflected by said target, receiver means within said missile for receiving said direct radio frequency signal and for mixing said direct signal with said reflected signal to thereby obtain a Doppler frequency signal, means within said missile for amplifying said Doppler frequency signal, and means also within said missile for telemetering said Doppler frequency signal to a remote point for analysis thereof to determine the distance that said missile misses said target.

References Cited in the file of this patent

UNITED STATES PATENTS

| | | |
|---|---|---|
| 2,491,542 | Woodyard et al. | Dec. 20, 1949 |
| 2,634,413 | Potter | Apr. 7, 1953 |
| 2,637,022 | De France | Apr. 28, 1953 |
| 2,717,370 | Piper | Sept. 6, 1955 |
| 2,801,049 | Richmond | July 30, 1957 |
| 2,866,192 | Johnson et al. | Dec. 23, 1958 |

OTHER REFERENCES

"How Accurate Are Radar Speed Meters" (J. Q. Brantley, Jr.), Electronics, December 1955; published by McGraw-Hill Publishing Co., Inc., New York. (Pp. 132–134 relied on.)